(12) United States Patent
Yang et al.

(10) Patent No.: US 12,504,213 B2
(45) Date of Patent: Dec. 23, 2025

(54) MANAGEMENT SERVER, METHOD FOR CONTROLLING THEREOF, AND HOME APPLIANCES MANAGED BY THE MANAGEMENT SERVER

(71) Applicant: LG ELECTRONICS INC., Seoul (KR)

(72) Inventors: Younghun Yang, Seoul (KR); Seo Hyun Han, Seoul (KR); Junsoo Han, Seoul (KR); Cholok Han, Seoul (KR); Hongshin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 18/094,022

(22) Filed: Jan. 6, 2023

(65) Prior Publication Data

US 2023/0266044 A1    Aug. 24, 2023

(30) Foreign Application Priority Data

Feb. 21, 2022  (KR) .......................... 10-2022-0021870

(51) Int. Cl.
*F25C 5/20*  (2018.01)
*F25C 5/187*  (2018.01)

(52) U.S. Cl.
CPC ................ *F25C 5/22* (2018.01); *F25C 5/187* (2013.01); *F25C 2500/08* (2013.01);
(Continued)

(58) Field of Classification Search
CPC ........ F25C 5/22; F25C 5/187; F25C 2500/08; F25C 2600/02; F25C 2600/04;
(Continued)

(56) References Cited

U.S. PATENT DOCUMENTS

| 2013/0087582 A1* | 4/2013 | Wing et al. ............... | F25C 5/20 |
| | | | 222/240 |
| 2013/0092707 A1* | 4/2013 | Kim et al. ................ | F25C 5/24 |
| | | | 222/146.6 |

(Continued)

FOREIGN PATENT DOCUMENTS

| JP | 2003121035 A | * | 4/2003 | ................ F25C 5/18 |
| JP | 2020122644 A | | 8/2020 | |

(Continued)

OTHER PUBLICATIONS

JP 2003121035 A Translation (Year: 2003).*

(Continued)

*Primary Examiner* — Jerry-Daryl Fletcher
*Assistant Examiner* — Dario Antonio Deleon
(74) *Attorney, Agent, or Firm* — Fish & Richardson P.C.

(57) ABSTRACT

The invention relates to a management server for an ice maker that includes: a communicator configured to receive operation information on extraction of ice stored in the ice maker and sensing information on an amount of the ice stored in the ice maker; and a controller configured, based on the received operation information and sensing information in a first time section and the received operation information and sensing information in a second time section after the first time section, to determine whether the ice stored in the ice maker is clumped in the second time section.

20 Claims, 9 Drawing Sheets

(52) U.S. Cl.
CPC ...... *F25C 2600/02* (2013.01); *F25C 2600/04* (2013.01); *F25C 2700/02* (2013.01)

(58) Field of Classification Search
CPC .......... F25C 2700/02; F25C 1/00; F25C 1/24; F25C 5/18; F25C 5/20; F25D 29/005; F25D 23/12; F25D 2700/12; G06N 3/08; G06Q 50/10
See application file for complete search history.

(56) References Cited

U.S. PATENT DOCUMENTS

| | | |
|---|---|---|
| 2015/0059366 A1 | 3/2015 | Visin |
| 2015/0241106 A1* | 8/2015 | Chase et al. ............ F25C 5/187 62/66 |
| 2015/0276293 A1* | 10/2015 | Seo et al. .............. F25D 23/126 222/1 |
| 2018/0313593 A1* | 11/2018 | Olvera et al. ........... F25D 17/08 |
| 2019/0196430 A1 | 6/2019 | Seo et al. |
| 2019/0196893 A1 | 6/2019 | Lee et al. |
| 2020/0244476 A1* | 7/2020 | Tae et al. .............. H04W 88/08 |
| 2021/0010734 A1* | 1/2021 | Miller .................... F25C 5/046 |
| 2021/0356202 A1 | 11/2021 | Han et al. |
| 2022/0083409 A1 | 3/2022 | Lee et al. |

FOREIGN PATENT DOCUMENTS

| | | |
|---|---|---|
| KR | 20000007867 A | 2/2000 |
| KR | 20130041700 A | 4/2013 |
| KR | 20150113574 A | 10/2015 |
| KR | 20160140063 A | 12/2016 |
| KR | 20180042008 A | 4/2018 |
| KR | 20190043258 | 4/2019 |
| KR | 20190076534 | 7/2019 |
| KR | 20190077771 | 7/2019 |
| KR | 102017087 | 10/2019 |

OTHER PUBLICATIONS

Extended Search Report in European Appln. No. 22217247.0, mailed on Jun. 23, 2023, 7 pages.
International Search Report in International Appln. No. PCT/KR2022/020415, mailed on Mar. 23, 2023, 4 pages.

* cited by examiner

MANAGEMENT SERVER, METHOD FOR CONTROLLING THEREOF, AND HOME APPLIANCES MANAGED BY THE MANAGEMENT SERVER

CROSS-REFERENCE TO RELATED APPLICATION

This application claims priority to and the benefit of Korean Patent Application No. 10-2022-0021870, filed on Feb. 21, 2022, the disclosure of which is incorporated herein by reference in its entirety.

TECHNICAL FIELD

Disclosed herein are a management server, a method for controlling thereof, and a home appliance managed by the management server.

BACKGROUND

Ice makers may be defined as a device used to make and store ice. As customers have diverse tastes and give their attention to high-end appliances, home appliances such as a refrigerator or a water purifier can be provided with an ice maker.

In some cases, home appliances can further include an ice extraction device such that users can extract produced ice without opening a door. The ice extraction device can be used to extract at least a portion of a plurality of ice cubes stored in an ice bin.

In some cases, an ice maker can include an ice making device that makes ice using cold air, an ice bin that stores the produced ice, a dispenser that extracts the stored ice to the outside, and the like. To maintain the state of the stored ice, cold air is further supplied to the ice bin.

In some cases, as a predetermined period of time passes by, the ice stored in the ice bin can be clumped together by cold air, i.e., ice clumping occurs. Ice clumping can cause inconvenience to users because the ice cannot be extracted to the outside. To prevent this from happening, ice clumping needs to be detected accurately.

In some cases, when a home appliance operates in a pattern different from a normal pattern, an operation error of the home appliance is predicted using a deep learning model. However, since users operate a home appliance in various patterns, a normal pattern cannot be defined exactly. Thus, the deep-learning model-based prediction of operational errors can lead to increasing inaccuracy.

SUMMARY

The present application describes a management server, a method for controlling thereof and a home appliance managed by the management server that accurately detects ice clumping which may happen in an ice maker.

The present application also describes a management server, a method for controlling thereof and a home appliance managed by the management server that informs a user about ice clumping when ice clumps in an ice maker or remotely declumps the clumped ice.

According to one aspect of the subject matter described in this application, a management server for an ice maker can include: a communicator configured to receive (i) operation information on extraction of ice stored in the ice maker and (ii) sensing information on an amount of the ice stored in the ice maker; and a controller configured, based on (i) the received operation information and sensing information in a first time section and (ii) the received operation information and sensing information in a second time section after the first time section, to determine whether the ice stored in the ice maker is clumped in the second time section.

Implementations according to this aspect can include one or more of the following features. For example, the controller can be configured, based on (i) an operation of extracting the ice not being performed and fullness of the ice being sensed in the first time section and (ii) the operation of extracting the ice being performed and fullness of the ice being sensed in the second time section, to determine whether the ice is clumped in the second time section. In some implementations, the controller can be configured, based on (i) the operation of extracting the ice being performed and fullness of the ice being sensed in the second time section and (ii) the operation of extracting the ice being performed at least once or more times and fullness of the ice being sensed in the second time section, to determine whether the ice is clumped in the second time section.

In some implementations, the ice maker can be configured, based on a user's input event, to generate operation information on extraction of the ice stored in the ice maker. In some implementations, the input event corresponds to the user's pressing of an ice extraction button, wherein the ice maker is configured, based on the ice extraction button being pressed for a predetermined time, to generate the operation information on extraction of the ice that corresponds to performance of the operation of extraction, and wherein the ice maker is configured, based on the ice extraction button being pressed for less than the predetermined time, to generate the operation information on extraction of the ice that corresponds to no performance of the operation of extraction.

In some implementations, the ice maker can include: an ice-fullness sensor configured to generate the sensing information; and an ice bin configured to receive the ice, wherein the ice-fullness sensor is configured to sense whether ice is present at an upper side of the ice bin.

In some implementations, the second time section can be a current time section, and the first time section can include a predetermined number of days prior to the current time section. In some implementations, a duration of the first time section can be set based on a temperature of cold air supplied to the ice maker.

In some implementations, the communicator can be configured to further receive turn-on information of the ice maker, and wherein the controller can be configured, based on the ice maker being turned on during the first time section, to determine whether the ice is clumped.

In some implementations, the ice maker can be provided in a home appliance, wherein the communicator is configured to further receive turn-on information of the home appliance, and wherein the controller is configured, based on (i) the home appliance being turned on during the second time section and (ii) the ice maker being turned on during the first time section, determine whether the ice is clumped.

In some implementations, the controller can be configured, based on the ice being clumped, to generate a guide message informing a user that the ice is clumped, and wherein the communicator can be configured to transmit the generated guide message to the ice maker and/or a user terminal device. In some implementations, the controller can be configured, based on the ice being clumped, to (i) generate a remote control instruction to declump the clumped ice, and (ii) transmit the generated remote control instruction to the ice maker. In some implementations, the remote control instruction can correspond to an operation instruction of a blade provided in the ice maker.

According to another aspect, a method for controlling a management server comprising a communicator and a controller can include: receiving, by the communicator, operation information on extraction of ice stored in an ice maker, and sensing information on an amount of the ice stored in the ice maker; and based on (i) the received operation information and sensing information in a first time section and (ii) the received operation information and sensing information in a second time section after the first time section, determining, by the controller, whether the ice stored in the ice maker is clumped in the second time section.

According to another aspect, a home appliance can include: a tray defining a space and configured to produce ice; an ice bin configured to receive the ice produced in the tray; an ice extraction opening defined in the ice bin, and configured to perform an operation for extracting the ice to an outside of the ice bin; a sensor disposed at an upper portion of the ice bin, and configured to sense an amount of the ice in the ice bin; and a controller configured, based on (i) the operation of extracting the ice and the amount of ice sensed in a first time section and (ii) the operation of extracting the ice and the amount of ice sensed in a second time section after the first time section, to determine whether the ice is clumped in the second time section.

In some implementations, the ice bin can include an ice bin main body including an upper main body and a lower main body. In some implementations, the ice bin main body can further include an inner slant wall configured to guide the ice from the tray to the lower main body, wherein the inner slant wall is disposed at an inner wall of the ice bin. In some implementations, the ice bin can further include an ice extraction member configured to rotate in the lower main body.

DETAILED DESCRIPTION

Hereinafter, one or more implementations of the present disclosure are specifically described below with reference to the accompanying drawings so that one having ordinary skill in the art to which the present disclosure pertains can easily realize the technical spirit of the disclosure. The embodiments may be modified in various different forms, and not limited to the embodiments set forth herein.

To clearly describe the subject matter in the disclosure, non-associated details are omitted. In the drawings, identical reference numerals can denote identical or similar components. Identical components are given identical reference numerals as far as possible although they are illustrated in different drawings. Further, detailed description of the well-known functions and configurations in relation to the disclosure is omitted if it is deemed to make the gist of the disclosure unnecessarily vague.

The terms "first", "second", "A", "B", "(a)", "(b)" and the like are used herein only to distinguish one component from another component. Thus, the terms do not intend to limit the essence, order, or number of the components. When any one component is described as being "connected", "coupled", or "connected" to another component, any one component can be directly connected or coupled to another component, but an additional component can be "interposed" between the two components or the two components can be "connected", "coupled", or "connected" by an additional component.

In the disclosure, the singular forms "a", "an" and "the" are intended to include the plural forms as well, unless explicitly indicated otherwise.

In the disclosure, singular forms include plural forms as well, unless explicitly indicated otherwise. It is to be understood that the term "comprise" or "include," when used in this disclosure, is not interpreted as necessarily including stated components or steps, but can be interpreted as excluding some of the stated components or steps or as further including additional components or steps.

In embodying the subject matter, components can be segmented for convenience of description. However, the components may be embodied in a single device or module, or one component may be divided and embodied into a plurality of devices or modules.

In some implementations, an ice maker in the disclosure can be installed in home appliances such as a refrigerator, a water purifier and the like. Alternatively, the ice maker in the disclosure can be an individual home appliance that is not installed in a refrigerator, a water purifier and the like. Hereinafter, an ice maker installed in a refrigerator is described for convenience of description. However, the ice maker according to the disclosure can be installed in various types of home appliances.

Figure 1:
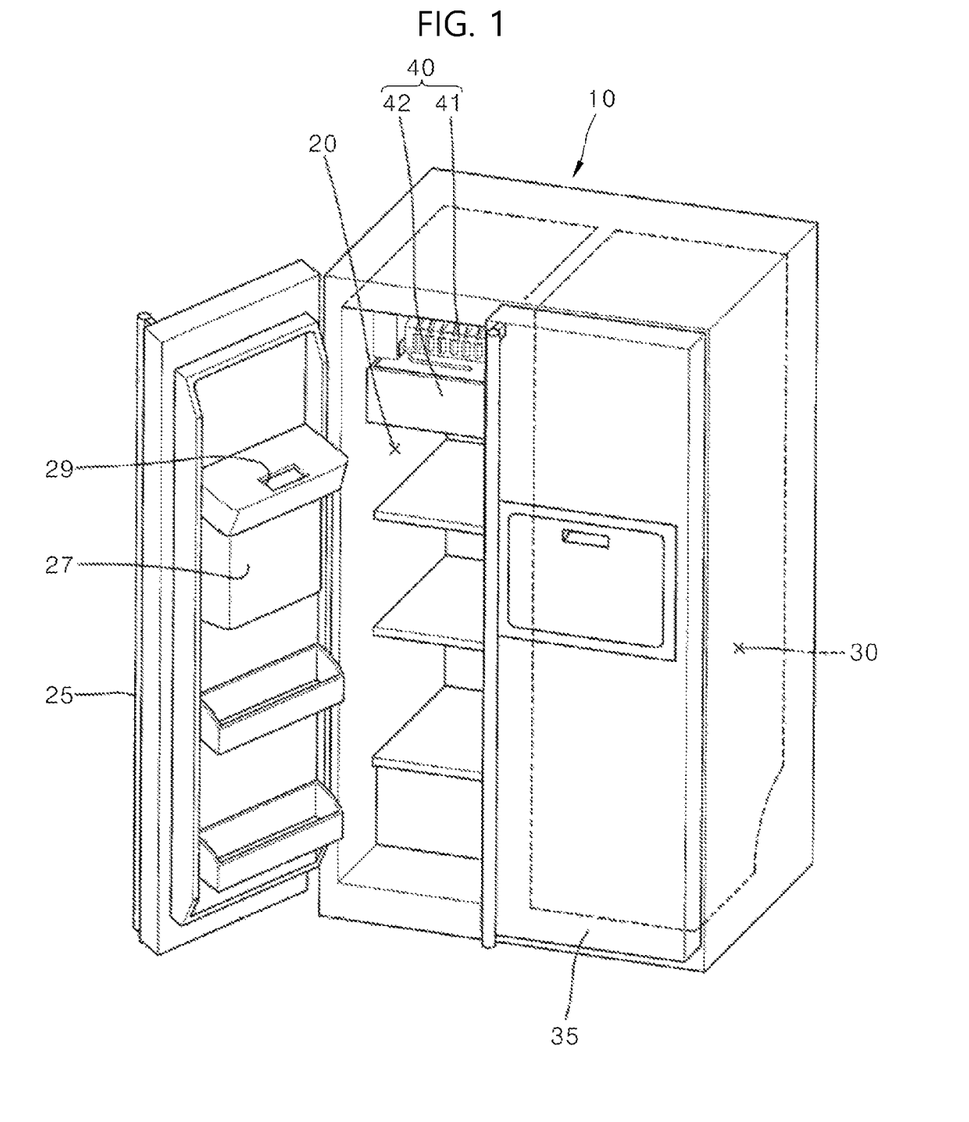
FIG. 1 is a view showing a schematic structure of an example refrigerator.

FIG. 1 is a view showing a schematic structure of an example refrigerator.

Referring to FIG. 1, a refrigerator may be an apparatus that can refrigerate or freeze food items and keep the food items fresh.

The refrigerator may include a refrigerator main body 10 having a freezer compartment 20 and a refrigerator compartment 30 therein, a freezer compartment door 25 installed in the refrigerator main body 10 and configured to open and close the freezer compartment 20, and a refrigerator compartment door 35 installed in the refrigerator main body 10 and configured to open and close the refrigerator compartment 30.

In some cases, the refrigerator may further include a cycle apparatus that supplies cold air to the freezer compartment 20 and the refrigerator compartment 30. A freezing cycle apparatus may be provided with a compressor that compresses refrigerants, a condenser that condenses refrigerants, an expander that reduces the pressure of refrigerants and expands the refrigerants, and an evaporator that vaporizes refrigerants.

The refrigerator may further include an ice maker 40. The ice maker 40 can be disposed in the freezer compartment 20, generate ice by using cold air supplied to the freezer compartment 20, and store generated ice.

The ice maker 40 may include a tray 41 that provides a space in which ice is generated, and an ice bin 42 which is disposed at the lower side of the tray 41 and in which the ice generated in the tray 41 is stored. The ice bin 42 may have an ice extraction opening 300 (FIG. 3) that performs an operation for extracting the stored ice outward.

In some cases, the refrigerator may further include a dispenser 27 that extracts the ice stored in the ice maker 40 with no need to open the freezer compartment door 25. The dispenser 27 may have an inlet 29, on the upper surface thereof. The inlet 29 may connect to the ice extraction opening 300. The ice stored in the ice bin 42 may be introduced into the dispenser 27 through the ice extraction opening 300 and the inlet 29.

Figure 2:
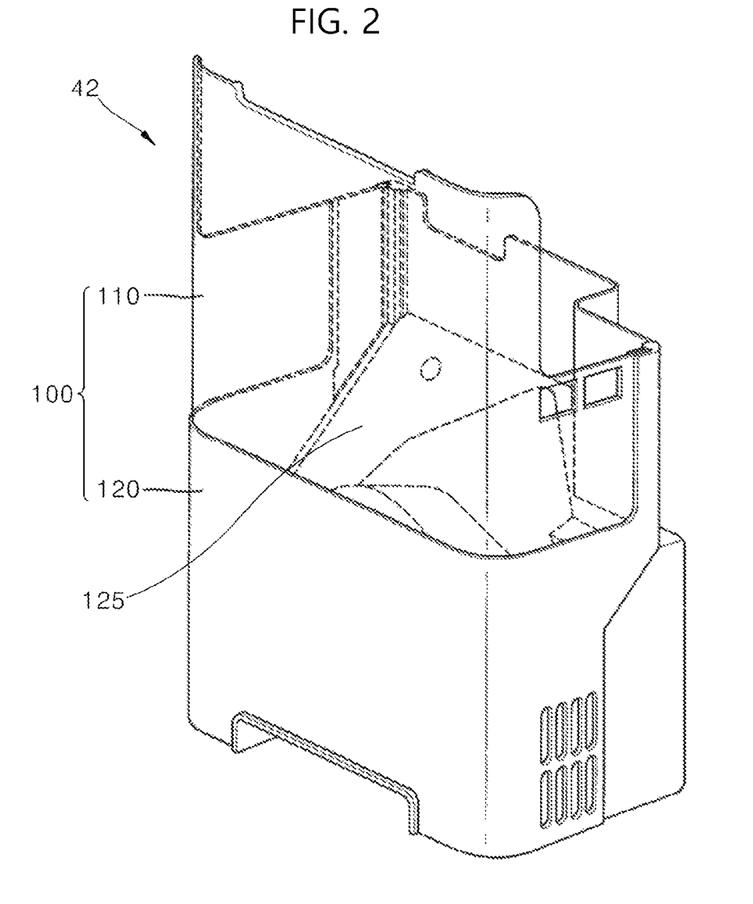
FIG. 2 is a perspective view showing an example ice bin viewed in one direction.
Figure 3:
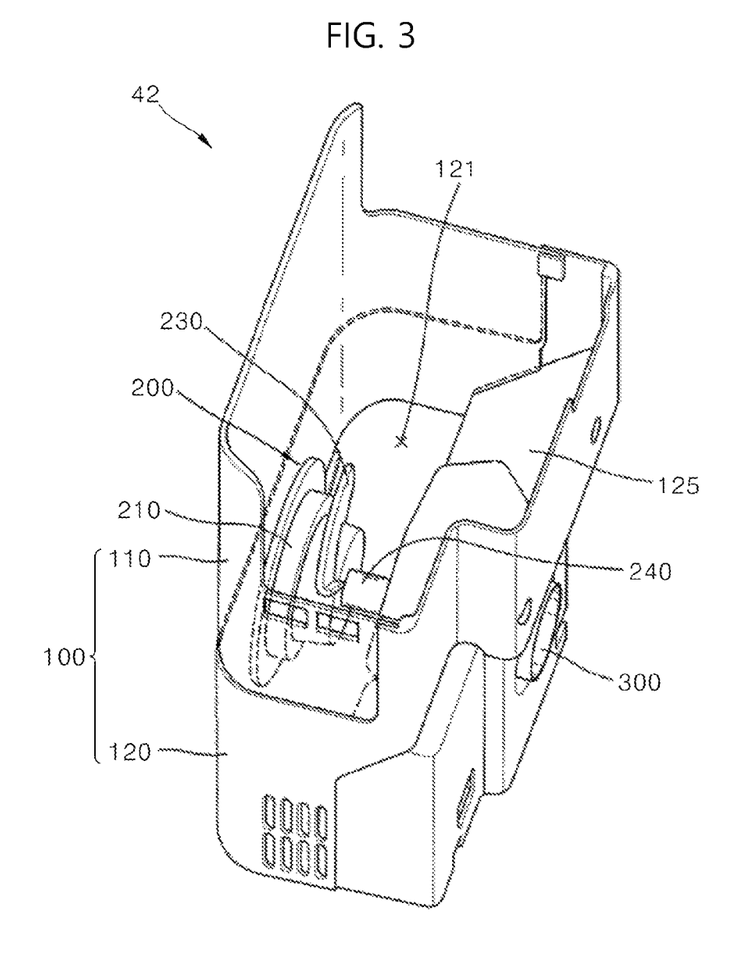
FIG. 3 is a perspective view showing an example ice bin viewed in another direction.

FIG. 2 is a perspective view showing an example ice bin 42 viewed in one direction. FIG. 3 is a perspective view showing an example ice bin 42 viewed in another direction.

Referring to FIGS. 2 and 3, the ice bin 42 may include an ice bin main body 100.

The ice bin main body 100 may include an upper main body 110 and a lower main body 120.

In some examples, the upper main body 110 may be transparent or translucent so that a user can see if an ice accommodation space 121 is filled with ice. The lower main body 120 may have an ice accommodation space 121, therein. Ice can be stored in the ice accommodating space 121.

In some examples, the ice bin main body 100 may have an inner slant wall 125 for guiding ice generated in the tray 41 to the lower main body 120, disposed on the inner wall of one side of the upper portion thereof. The inner slant wall 125 may be formed across the upper main body 110 and the lower main body 120.

The ice bin 42 may further include an ice extraction member 200. The ice extraction member 200 may be installed in a way that the ice extraction member 200 can rotate in the lower main body 120.

The ice extraction member 200 may include a rotation cam 210, a blade 230, a blade mounting shaft 240 and an ice extraction opening 300.

The rotation cam 210 may receive a rotation force from an external motor and rotate. The blade mounting shaft 240 may protrude from one side of the inner surface of the lower main body 120. The blade mounting shaft 240 may have the blade 230, disposed on the outer circumferential surface thereof. As the rotation cam 210 and the blade 230 operate, the ice stored in the ice accommodation space 121 may be extracted out of the ice extraction opening 300.

The ice extraction opening 300 may be formed in the lower main body 120, and perform an operation for extracting stored ice outward. The operation for extracting ice outward may correspond to opening and closing operations of the ice extraction opening 300. When the ice extraction opening 300 is open, stored ice may be delivered to the dispenser 27, and the user can use the ice. When the ice extraction opening 300 is closed, stored ice may not be delivered to the dispenser 27.

In some cases, the ice maker 40 may further include an ice-fullness sensing lever. The ice-fullness sensing lever may be disposed at the upper portion of the ice bin 42, and sense the fullness of the ice stored in the ice bin 42. That is, the ice-fullness sensing lever may correspond to a sensor that senses the upper side of the ice bin 42 and detects the fullness of ice.

Additionally, ice generated in the tray 41 may be accommodated and stored in the ice bin 42. However, when ice is stored in the ice bin 42 for a long time, the ice cubes stored in the ice bin 42 can stick together because of cold air supplied to the freezer compartment 20. That is, clumping of ice can occur. As clumping occurs, the ice cubes may not be extracted outward, causing inconvenience to the user. To prevent this from happening, clumping needs to be detected accurately.

Hereafter, implementations of methods of accurately detecting clumping in the ice bin 42 according to the present disclosure are described with reference to FIGS. 4 to 7.

Figure 4:
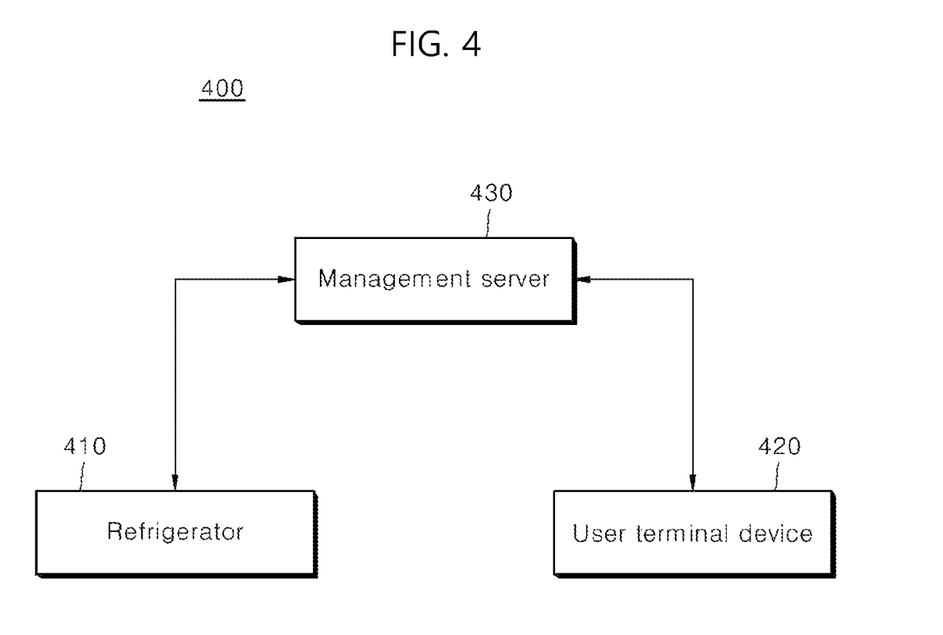
FIG. 4 is a schematic block diagram showing an example configuration of a remote management system.

FIG. 4 is a schematic block diagram showing an example configuration of a remote management system 400.

Referring to FIG. 4, the remote management system 400 may include a refrigerator 410, a user terminal device 420 and a management server 430.

In some examples, the refrigerator 410 may be an apparatus that is installed in the user's living space, workspace and the like to store food items and generate and store ice cubes. In some cases, the refrigerator 410 may be provided with an ice maker 40.

Figure 5:
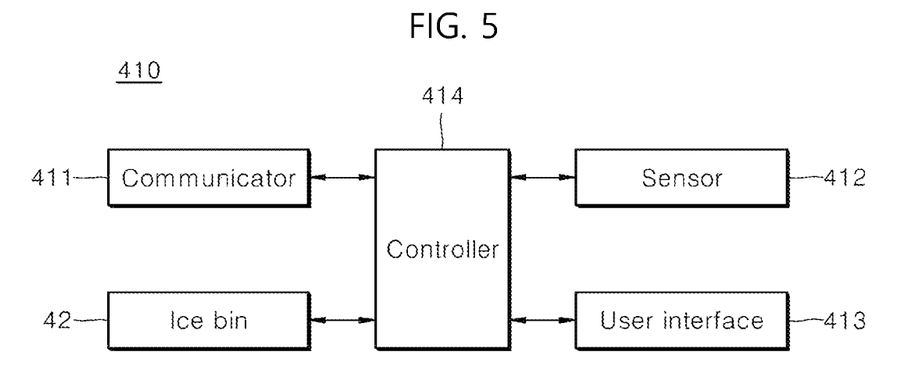
FIG. 5 is a schematic block diagram showing an example configuration of the refrigerator.

FIG. 5 is a schematic block diagram showing an exemplary configuration of the refrigerator 410.

The mechanical configuration of the refrigerator 410 is described with reference to FIGS. 1 to 3. Hereinafter, a configuration for control of the refrigerator 410 is described.

Referring to FIG. 5, the refrigerator 410 may include a communicator 411, an ice bin 42, a sensor 412, a user interface 413, and a controller 414.

In some examples, the communicator 411 may communicate with the management server 430. The communicator 411 may transmit and receive data in a wired and/or wireless manner.

In some cases, the communicator 411 may include a short range wireless communication module that implements short range wireless communication. The near field wireless communication module may be a wireless communication module based on Wireless Fidelity (Wi-Fi), Bluetooth, radio frequency identification (RFID), Infrared Data Association (IrDA), ultra-wideband (UWB), ZigBee and the like.

In the case of a communicator 411 including a near field wireless communication module, an access point may be provided in the user's living space. The access point may be a device that relays wireless communication with the management server 430 and the communicator 411. For example, when the communicator 411 includes a WiFi module, the access point may be a WiFi router.

In another implementation, the communicator 411 may include a long range wireless communication module that implements long range wireless communication. For example, the long range wireless communication module may be a wireless communication module based on code division multiple access (CDMA), frequency division multiple access (FDMA), time division multiple access (TDMA), orthogonal frequency division multiple access (OFDMA), single carrier frequency division multiple access (SCFDMA), or 5G and the like.

The ice bin 42 may be disposed in the ice maker 40, and include an ice extraction opening 300 for extracting ice cubes to the outside.

In some examples, a sensor 412 may correspond to the above-mentioned sensor (i.e., an ice-fullness sensing lever) that senses the fullness of ice.

The user interface 413 may output operation information of the refrigerator 410 to the user visually or acoustically, and receive an input for controlling the operations of the refrigerator 410 from the user. In some examples, the user interface 413 may include a touch display module on which a logical button is marked, and include an input part including a physical button. In another example, the user interface 413 may include a speaker module.

In some cases, the controller 414 may control the entire operations of the refrigerator 410. The controller 414 may correspond to a micom (micro computer, micro processor). In particular, the controller 414 may control the operations of the ice extraction opening 300, and receive information sensed by the ice-fullness sensing lever (sensor).

The controller 414 may include a processor and an internal memory. The processor may include one or more of a central processing unit (CPU), an application processor or a communication processor. The processor may operate based on firmware and execute one or more instructions in relation to control of a home appliance (e.g., a refrigerator). The internal memory may be a volatile and/or non-volatile memory. Firmware may be stored in the internal memory, and one or more instructions in relation to control may be stored in the internal memory.

Referring to FIG. 4, the user terminal device 420 may be a device possessed by the user. For example, the user terminal device 420 may include a smartphone, a laptop, a tablet PC, a smart TV, a smart watch and the like.

In some cases, the management server 430 may be a device that manages the refrigerator 410 remotely. The management server 430 may communicably connect to the refrigerator 410 through a communication network. Additionally, the management server 430 may communicably connect to the user terminal device 420, and interlock with the user terminal device 420 to manage the refrigerator 410.

Figure 6:
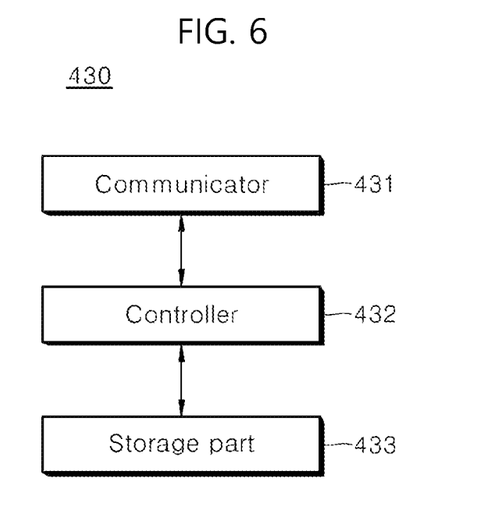
FIG. 6 is a schematic block diagram showing an example configuration of a management server.

FIG. 6 is a schematic block diagram showing an example configuration of a management server 430.

Referring to FIG. 6, the management server 430 may include a communicator 431, a controller 432, and a storage part 433.

In some cases, the communicator 431 may communicate with the refrigerator 410 and the user terminal device 420. The communicator 431 may communicate in a wired and/or wireless manner. Wireless communication may involve short range wireless communication and long range wireless communication.

The controller 432 may control the management server 430 entirely. Additionally, the controller 432 may determine whether ice clumping occurs in the ice maker 40.

In some cases, the controller 432 may include a processor and an internal memory. The processor may include one or more of a central processing unit (CPU), an application processor, or a communication processor. The processor may execute one or more instructions in relation to control over the refrigerator 410. The internal memory may be a volatile and/or non-volatile memory. One or more instructions may be stored in the internal memory.

The storage part 433 may be a volatile and/or non-volatile memory. Various types of information may be stored in the storage part 433.

Figure 7:
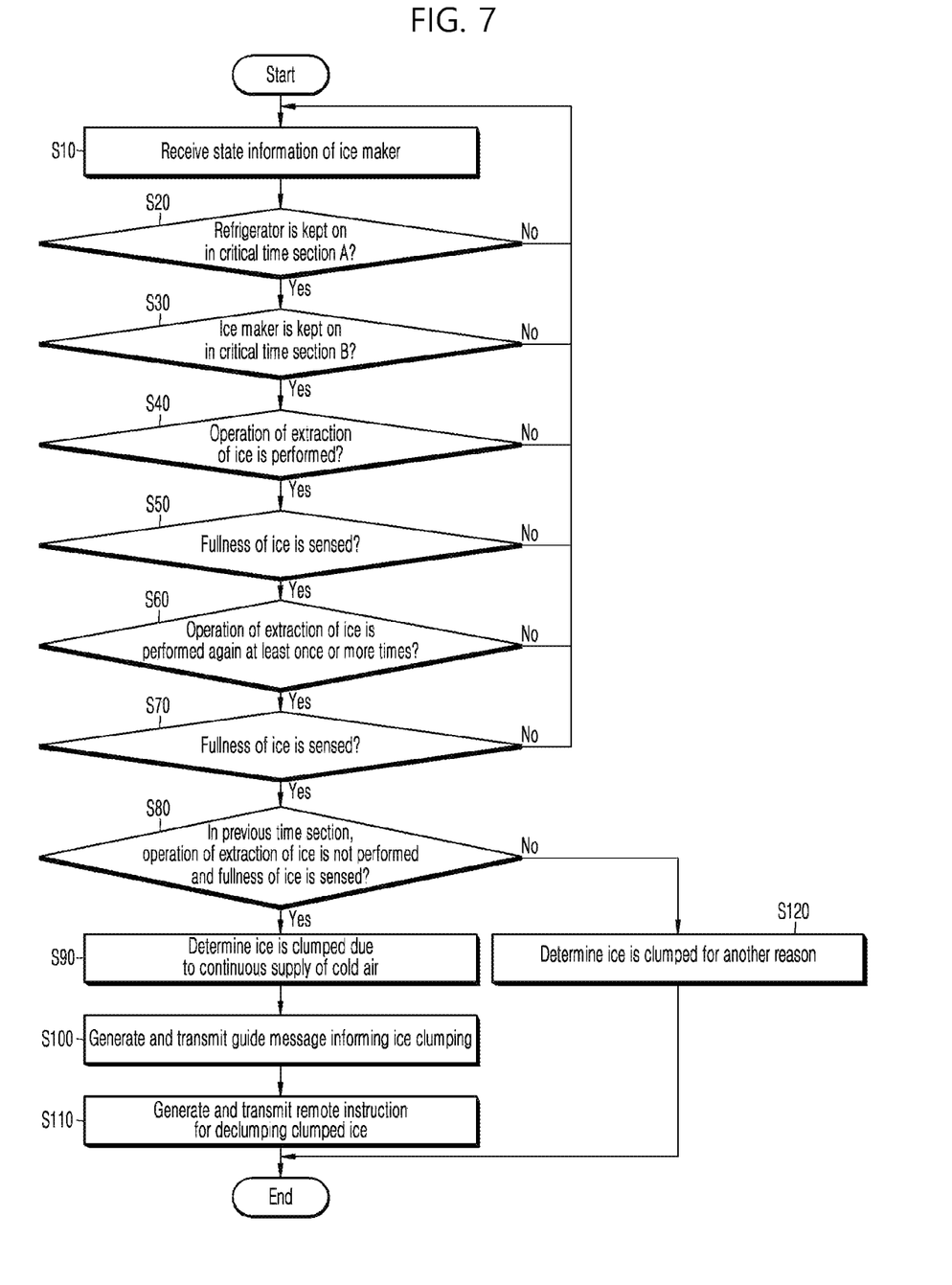
FIG. 7 is a flow chart showing an example method by which an ice maker determines ice clumping and declumps clumped ice.

FIG. 7 is a flow chart showing an example method by which an ice maker 40 determines ice clumping and declumps clumped ice.

The steps in FIG. 7 may be performed by the management server 430. For example, FIG. 7 shows an example method of controlling the management server 430. Additionally, in some cases the ice maker 40 can be installed in the refrigerator 410, as described above.

In some examples, ice generated in the tray 41 is stored in the ice bin 42, and the stored ice may clump, causing ice clumping. In this case, the ice stored in the ice bin 42 may partially clump.

Specifically, cold air may flow into the upper side of the ice bin 42. Accordingly, the ice stored in the ice bin 42 may all be clumped by the cold air. However, while the ice stored at the upper side of the ice bin 42 that directly contacts the cold air clumps, the ice stored at the lower side of the ice bin 42 that does not directly contact the cold air may not clump.

When all the ice stored in the ice bin 42 clumps, the ice may not be delivered to the dispenser 27 even if the user presses an extraction operation button. Additionally, when the user presses the extraction operation button in a state in which the ice stored in the ice bin 42 partially clumps, the ice stored at the lower side of the ice bin 42 may be partially delivered to the dispenser 27, but as time passes, most of the ice stored in the ice bin 42 may not be delivered to the dispenser 27.

Further, as described above, the sensor 412 of the ice maker 40, the ice-fullness sensing lever, may be disposed at the upper portion of the ice bin 42, and sense the upper side of the ice bin 42 and detect the fullness of ice.

Hereinafter, each of the steps is described with reference to FIG. 7.

In step S10, the communicator 431 may receive state information of the ice maker 40 from the refrigerator 410. That is, step S10 involves collecting information to determine occurrence of ice clumping.

In some implementations, the refrigerator 410 may transmit state information of the ice maker 40, based on a predetermined cycle (e.g., five minutes), in real time, and the communicator 431 may receive the transmitted state information of the ice maker 40. In some cases, the received state information of the ice maker 40 may be stored in the storage part 433.

In some implementations, the state information of the ice maker 40 may include turn-on information of the refrigerator 410, turn-on information of the ice maker 40, operation information on extraction of ice stored in the ice maker 40 and sensing information of an amount of ice stored in the ice maker 40.

The turn-on information of the refrigerator 410 may be information as to whether an external power source is supplied to the refrigerator 410. The turn-on information of the ice maker 40 may be information as to whether the ice maker 40 performs the operations of generating and storing ice.

In some cases, the operation information on extraction of ice may correspond to the opening and closing information of the ice extraction opening 300. That is, the operation information on extraction of ice may include operation information of first extraction corresponding to the opening of the ice extraction opening 300, and operation information of second extraction corresponding to the closing of the ice extraction opening 300. As the ice extraction opening 300 is opened, the ice stored in the ice maker 40 may be delivered to the dispenser 27 through the inlet 29. Additionally, when the ice extraction opening 300 is closed, the ice stored in the ice maker 40 may not be delivered to the dispenser 27.

The information on the opening and closing of the ice extraction opening 300, i.e., the operation information on extraction of ice, may be generated based on an input event of the user for extracting ice from the ice maker 40.

For example, the default state of the ice extraction opening 300 may be a closed state. In this case, the operation information on extraction of ice may be the operation information on second extraction. Additionally, the user interface 413 of the refrigerator 410 may include an ice extraction button (a physical button or a virtual button). When an event in which the user presses the ice extraction button happens, the closed ice extraction opening 300 may be open. In this case, the operation information on extraction of ice may be the operation information on first extraction.

Further, there are times when the user presses the ice extraction button mistakenly without intention to extract ice. In this case, the operation information on extraction of ice may be inaccurate. To prevent this from happening, when the ice extraction button is pressed for a predetermined critical time (e.g., three seconds) or greater, the operation information on first extraction corresponding to performance of an operation of extracting ice may be created. When the ice extraction button is pressed for less than the predetermined critical time, the operation information on second extraction corresponding to no performance of the operation of extracting ice may be created.

Steps S20 to S90 may involve determining whether ice clumping occurs, based on the state information of the ice maker 40. Steps S20 to S90 may be performed in every predetermined cycle. For example, steps S20 to S90 may be performed once a day.

In some implementations, in step S20, the controller 432 may determine whether the refrigerator 410 is kept on in predetermined critical time section A (i.e., a second critical time section).

When the refrigerator 410 is kept on in critical time section A, the controller 432 may determine whether the ice maker 40 is kept on in predetermined critical time section B (i.e., a first critical time section) in step S30.

Herein, critical time section B may be included in critical time section A. In some examples, critical time section A may be 36 hours.

Steps S20 and S30 may involve determining whether the refrigerator 410 operates normally, and whether the ice maker 40 makes ice.

In some implementations, when the conditions in steps S20 and S30 are all satisfied, the controller 432 may determine whether the operation of extracting ice is performed in step S40.

According to the user's input event, it can be determined whether the operation of extracting ice is performed or not. So, the ice maker may extract ice based on the input event of the user. An example of user's input event is user's gesture in front of ice maker or manipulation of ice maker. An example of user's gesture is approaching to the ice maker or touching the ice maker. An example of manipulation of icemaker is pressing button of the ice maker or touching the ice maker. These gesture or manipulation can be determined as operation of extracting ice.

When the operation of extracting ice is performed, the controller 432 may determine whether the fullness of the ice stored in the ice maker 40 is sensed, in step S50.

When the fullness of the ice stored in the ice maker is sensed even after the operation of extracting ice is performed, the controller 432 may determine whether the operation of extracting ice is performed at least once or more times, in step S60.

When the operation of extracting ice is performed at least once or more times, the controller 432 may determine whether the fullness of the ice stored in the ice maker 40 is sensed, again, in step S70.

Steps S60 and S70 are additional steps for determining ice clumping more accurately, and in another implementation, steps S60 and S70 may be omitted.

When the fullness of the ice stored in the ice maker 40 is sensed again even after the operation of extracting ice is performed at least once or more times, the controller 432 may determine whether the fullness of the ice is sensed without performing the operation of extracting ice in a previous time section, in step S80.

The previous time section (the first time section) may be a past time section of a current time section (the second time section). In some implementations, the previous time section may be a predetermined time section prior to the current time section. Duration of the first time section may be set based on a temperature of cold air supplied from the ice maker 40.

In some examples, when the temperature of cold air is a default temperature of $-18°$ C., the predetermined time section may be "five days". When the temperature of cold air is less than the default temperature, the predetermined time section may decrease. When the temperature of cold air is greater than the default temperature, the predetermined time section may increase.

If the fullness of ice is sensed without performing the operation of extracting ice in the previous time section, the controller 432 may determine that ice clumping occurs based on a continuous supply of cold air, in step S90. Additionally, if the operation of extracting ice is performed or the fullness of ice is not sensed in the previous time section, the controller 432 may determine that ice clumping occurs for another reason, in step S120.

In some cases, in the current time section, the user may press the ice extraction button to use ice (S40). However, even after the ice extraction button is pressed, no ice or a small amount of ice may be extracted. In addition, the fullness of the ice stored in the ice maker 40 may be sensed (S50). This may happen when the sensor 412 senses the upper side of the ice maker 40.

When a sufficient amount of ice is not extracted, the user may press the ice extraction button again one or more times (S60). However, ice may not be extracted, and the fullness of the ice stored in the ice maker 40 may be sensed again (S70). Based on this information, the management server 430 may determine that the ice is clumped, primarily (S40-S70).

Then the management server 430 may make a secondary determination, based on the past state of the ice maker 40 (S80). That is, the management server 430 may determine whether the operation of extraction of ice has been performed and the fullness of the ice stored in the ice maker 40 has been sensed in the past time section of the current time section, e.g., for the past five days.

When the operation of extracting ice has not be performed and the fullness of the ice has been sensed for the past five days, the management server 430 may determine that the ice is clumped because the ice maker 40 has not been used for a long time (S90). That is, the management server 430 may determine that ice clumping occurs because of a continuous supply of cold air (S90).

In summary, the management server 430 may receive and store the operation information on extraction of ice stored in the ice maker 40 and the sensing information on an amount of the ice in real time. In some cases, the management server 430 may determine whether ice clumping caused by a continuous supply of cold air in the current time section occurs, based on operation information on extraction of ice and sensing information on an amount of ice in the past time section (the first time section), and operation information on extraction of ice and sensing information on an amount of ice in the current time section (the second time section).

When the fullness of ice is sensed while the operation of extracting ice is not performed in the past time section, and when the fullness of ice is sensed even after the operation of extracting ice is not performed in the current time section, the management server 430 may determine that ice is clumped in the second time section.

When determining that ice is clumped, the controller 432 may generate a guide message informing the user about ice clumping, and the communicator 431 may transmit the generated guide message to the user terminal device 420 and/or the refrigerator 410, in step S100. The guide message may be output through the display of the user terminal device 420 or the user interface 413 of the refrigerator 410, and the user may find ice clumping.

In some examples, when determining that ice is clumped, the controller 432 may generate a remote control instruction for declumping the clumped ice, and the communicator 431 may transmit the generated remote control instruction to the refrigerator 410, in step S110. The remote control instruction may correspond to the operation instruction (i.e., the rotation instruction) of the blade 230. Accordingly, the ice may be declumped without any help from the user.

In some cases, step S110 is performed after step S100. In other cases, step S110 may be performed before step S100, or any one of step S100 and step S110 may be performed.

Further, instead of the management server 430, the refrigerator 410 may make the above-described determination of ice clumping. That is, the controller 414 of the refrigerator 410 may perform steps S20 to S90.

Figure 8:
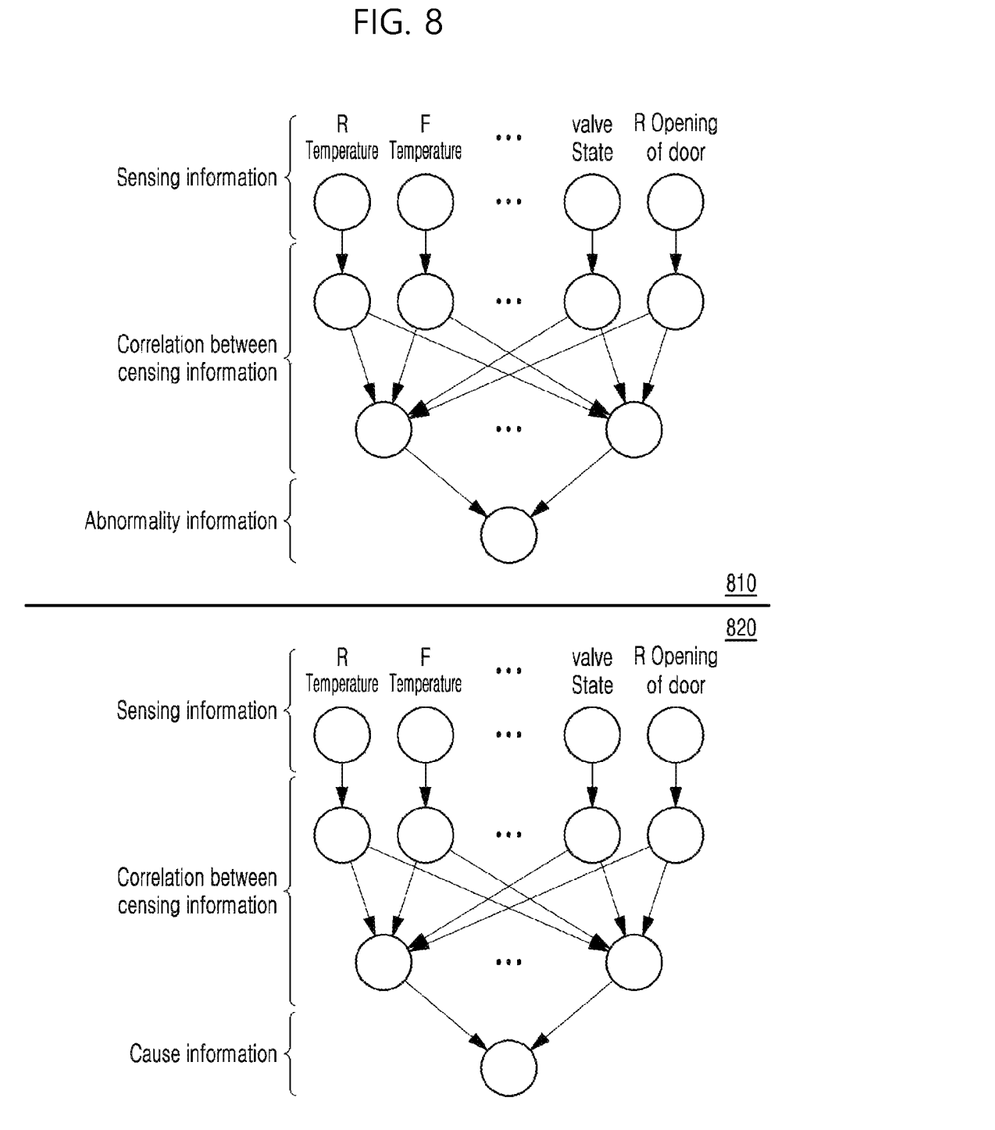
FIG. 8 is a view showing an example process of diagnosing abnormality and causes for the abnormality, based on sensing information sensed by the refrigerator.

FIG. 8 is a view showing an example process of diagnosing abnormality and causes for the abnormality, based on sensing information sensed by the refrigerator 410.

FIG. 8 may be associated with step S100 and step S110 described with reference to FIG. 7.

In some implementations, an abnormality diagnosing part 810 and a cause diagnosing part 820 may diagnose the normal or abnormal state of the refrigerator 410 based on the sensing information, and may find out the cause for failure based on the normal/abnormal state.

Pieces of predetermined sensing information are input to the abnormality diagnosing part 810, and based on a correlation among the pieces of predetermined sensing information and a pattern of the accumulated predetermined sensing information, the abnormality diagnosing part 810 may determine whether the refrigerator 410 is currently in the normal state or the abnormal state. That is, the abnormality diagnosing part 810 may generate abnormality information and the abnormality information may have a value described hereafter.

Abnormality information={Normal,Abnormal}

In some implementations, the refrigerator 410 may be provided with various types of sensors, and information sensed by the sensors may be non-temporal information or temporal pattern information, and the information may be stored. In FIG. 8, a temperature of the refrigerator compartment, a temperature of the freezer compartment, a state of the valve, the opening of the door of the refrigerator compartment, the fullness of ice stored in the ice maker and the like may be input as the sensing information.

The sensing information sensed in real time or stored sensing information is input to input layers of the abnormality diagnosing part 810. In some cases, the abnormality diagnosing part 810 has built up a network of a correlation between the sensing information by performing learning based on large amounts of previous normal sensing information and abnormal sensing information.

When the sensing information is input to an input part of the network comprised of nodes and edges capable of ascertaining a normal pattern of the refrigerator 410, the abnormality diagnosing part 810 outputs abnormality information, based on the sensing information. An output value indicates normality or abnormality. The normality or abnormality is not limited to a currently output normality or abnormality, and a state causing failure may also be included in the abnormal state before the failure is identified from the outside.

In some cases, the abnormality diagnosing part 810 may make a determination based on how much the input sensing information matches the normal pattern. The abnormality diagnosing part may determine the normal/abnormal state depending on whether the input sensing information is in or out of a critical value of the normal pattern.

Since the abnormality diagnosing part 810 receives the sensing information that is generated and sensed at regular intervals (e.g., in one minute cycle), the abnormality diagnosing part 810 may only check whether abnormality happens. When no abnormality happens, the sensing information is input to the abnormality diagnosing part 810 to monitor the operation of the refrigerator 410 continually without an additional operation of the cause diagnosing part 820.

When abnormality happens, the cause diagnosing part 820 identifies a sensor closely associated with the abnormality, and based on the identified sensor, diagnoses the cause for the abnormality. To this end, the cause diagnosing part 820 may generate cause information of the abnormality, using the sensing information and meta information generated from the sensing information. In some cases, the cause diagnosing part 820 has built up a network of correlation between the sensing information indicating a pattern showing various types of failures. If the input sensing information matches a pattern of the cause for the failure of the refrigerator 410, then the cause for the current abnormality may be the matched pattern of cause. The cause diagnosing part 820 stochastically determines the cause of abnormality based on the similarity between the pattern indicating causes for various types of failures and the input sensing information.

In FIG. 8, two diagnosing parts 810, 820 in association with abnormality are provided, and the diagnosing parts may be included in the refrigerator 410 or a cloud server. Alternatively, the two diagnosing parts 810, 820 may be respectively disposed in the refrigerator 410 and the cloud server.

In some cases, the abnormality diagnosing part 810 may generate two or more pieces of state information (abnormality or normality).

The cause diagnosing part 820 stochastically calculates the similarity between the pattern indicating causes of failures and the sensing information. For example, the cause diagnosing part 820 may output one or more causes for failure such as the opening the door of the refrigerator compartment (90%) of and the leak of the valve (10%) and generate cause information with a probability value of the cause.

Thus, action may be taken in response to the cause for failure. A response for a service may include providing information for dealing with failure to the display of the refrigerator 410 or generating information such as an appointment for a visit of a customer service provider. In particular, a response for a service may include operating with a monitoring server in charge of a customer service and obtaining a necessary material in advance to prevent failure to provide a customer service, and providing a remote customer service for preventing failure as a preemptive response.

For example, the preemptive response for preventing failure may include defrosting operation at a time of failure in defrosting, and increasing refrigeration control temperature at a time of over cooling of the refrigerator compartment and the like.

The features described with reference to FIG. 8 are summarized as follows. Among pieces of information generated by various types of sensors of the refrigerator 410, some are appropriate for determining the normal or abnormal state, and others are appropriate for diagnosing the cause for failure. Accordingly, pieces of information are distinguished. Using the distinguished information, abnormality is diagnosed primarily, and at a time of abnormality, the cause for the abnormality is diagnosed secondarily.

For example, in FIG. 8, the abnormality diagnosing part 810 and the cause diagnosing part 820 are separately implemented. The separately implemented components may be disposed in the refrigerator 410 or the server.

However, the components are trained based on deep learning, and while the components are trained, sensing information may be provided via big data. The cause diagnosing part 820 may be implemented as a single component, and for various reasons, may be segmented. For example, a first cause diagnosing part may be comprised of a deep learning engine that diagnoses the cause for failure in cooling, and a second cause diagnosing part may be comprised of an engine that diagnoses the cause for failure in temperature.

Depending on some implementations, the abnormality diagnosing part 810 and the cause diagnosing part 820 are both implemented in the refrigerator 410, the abnormality diagnosing part 810 and the cause diagnosing part 820 are both implemented in the server, or the abnormality diagnosing part 810 is implemented in the refrigerator 410 while the cause diagnosing part is implemented in the server. However, the classification may not denote a difference in the configuration of the abnormality diagnosing part 810 and the cause diagnosing part 820.

Certainly, the abnormality diagnosing part 810 may be implemented in the server, while the cause diagnosing part 820 is implemented in the refrigerator 410. However, the abnormality diagnosing part 810 requires less computing power than the cause diagnosing part 820. Considering the fact, the abnormality diagnosing part 810 and the cause diagnosing part 820 may be implemented separately in the refrigerator 410 and the server.

In some cases, software installed in the controller 414 of the refrigerator 410 may need to be upgraded to determine whether ice is clumped in the ice maker. Hereinafter, a process of upgrading software is described with reference to FIG. 9.

Figure 9:
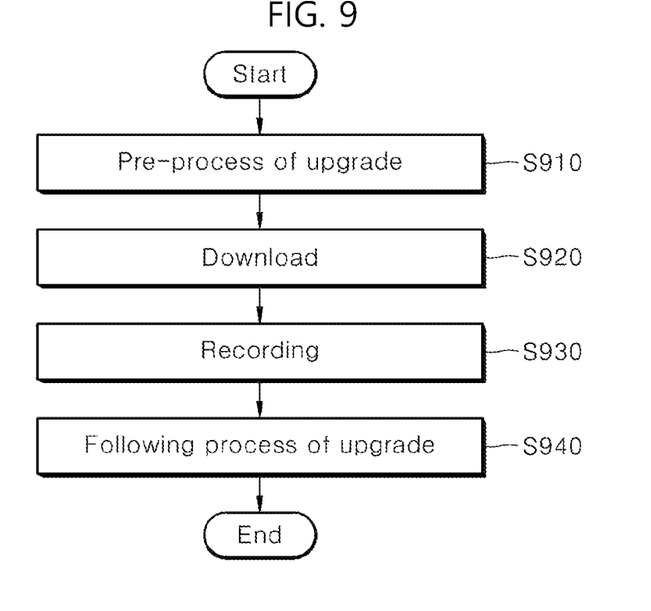
FIG. 9 is a flow chart showing an example method of upgrading the refrigerator.

FIG. 9 is a flow chart showing an example method of upgrading the refrigerator 410.

In some implementations, the refrigerator 410, the user terminal device 420 and the management server 430 described above may interlock with each other to carry out the method of upgrading software.

In step S910, a pre-process of an upgrade may be performed.

In step S910, the refrigerator 410 and the management server 430 may connect to each other in a communicable manner, and information on an upgrade may be stored in the storage part 433 of the management server 430. Additionally, an upgrade schedule including an upgrade cycle, an upgrade reservation and the like may be set.

In steps S920 and S930, an upgrade may be performed.

In step S920, during the upgrade, download may be performed.

In some cases, the management server 430 may transmit software data to the refrigerator 410. The communicator 411 of the refrigerator 410 may receive the software data transmitted from the management server 430, and then the software data may be stored in the communicator 411 of the refrigerator 410. To this end, the communicator 411 may include an additional storage part. Further, the transmitted software data may be firmware data or contents program data, as described above.

The software data may include two or more firmware data, and the management server 430 may consecutively transmit the two or more firmware data to the refrigerator 410. That is, when a plurality of controllers 414 included in the refrigerator 410 is upgraded, the management server 430 may consecutively transmit the two or more firmware data corresponding to the plurality of controllers 414 to the refrigerator 410. The order of transmitting the two or more firmware data may be set in advance.

In some cases, the software data may include two or more contents program data, and the management server 430 may consecutively transmit the two or more contents program data to the refrigerator 410. The two or more contents program data may be respectively data of a content program executed by the plurality of controllers 414 of the refrigerator 410. The order of transmitting the two or more contents program data may be set in advance.

In some cases, the software data may include at least one firmware data and at least one contents program data. In this case, the management server 430 may consecutively transmit at least one firmware data and at least one contents program data.

Then in step S930, recording may be performed during the upgrade.

In some examples, the communicator 411 of the refrigerator 410 may record (e.g., write) the stored software data in the plurality of controllers 414. Since the software data is recorded in the controllers 414, software may be installed in the controllers 414.

When the plurality of software data stored in the communicator 411 of the refrigerator 410 includes two or more firmware data, the communicator 411 may record the two or more firmware data respectively in a corresponding controller. The order of recording the two or more firmware data may be set in advance.

In some cases, when the plurality of software data stored in the communicator 411 of the refrigerator 410 includes two or more contents program data, the communicator 411 may record the two or more contents program data in a corresponding controller. The order of recording the two or more contents program data may be set in advance.

In some cases, when the plurality of software data stored in the communicator 411 of the refrigerator 410 includes at least one firmware data and at least one contents program data, the communicator 411 may record includes at least one firmware data and at least one contents program data in a corresponding controller. The order of recording at least one firmware data and at least one contents program data may be set in advance. For example, when the plurality of software data are firmware data and contents program data related to the user interface, the firmware data may be recorded and then the contents program data may be recorded.

In step S940, a following process of the upgrade may be performed.

For example, in step S940, a specific function of the upgraded software may be set. In particular, when the upgrade of plurality of software is completed, a specific function of each of the plurality of software may be consecutively set.

The implementations in the present disclosure may be implemented in the form of program instructions to be executed through a variety of computer devices so as to be recorded on a computer-readable recording medium. The computer-readable recording medium can independently comprise program instructions, data files, data structures and the like or a combination thereof. The program instructions recorded on the medium may be specially designed and configured for the subject matter of the present disclosure or may be well-known to and used by those skilled in the art relating to computer software program. Examples of the computer-readable recording media include magnetic media such as hard disks, floppy disks and magnetic tape, optical media such as CD-ROMs and DVDs, magneto-optical media such as optical disks, and hardware devices that are specially configured to store and perform program instructions such as Read Only Memory (ROM), Random Access Memory (RAM), flash memory etc. Examples of the program instructions include a high-level language code executed by the computer through an interpreter as well as a machine language code produced by a compiler. The hardware devices may be configured to operate as one or more of software modules for performing the operation of the embodiments in the disclosure, and vice versa.

The subject matter of the present disclosure is described with reference to particulars such as the components, the limited implementations and the limited drawings, but they are provided for a comprehensive understanding of the subject matter in the disclosure. Implementations are not limited to the implementations set forth herein, and those of ordinary skill in the art to which the disclosure pertains can understand that various modifications and changes are drawn from the particular, implementations and drawings. Thus, the technical scope of the present disclosure should not be limitedly defined by the implementations described herein, and the claims, and the equivalents and modifications thereof should be included in the technical scope of the present disclosure.

What is claimed is:

1. A management server for managing a refrigerator remotely, comprising:
    a communicator configured to communicate with the refrigerator in a wired or wireless manner, and receive (i) operation information on extraction of ice stored in an ice maker of the refrigerator and (ii) sensing information on an amount of the ice stored in the ice maker; and
    a controller, based on (i) the received operation information and sensing information in a first time section and (ii) the received operation information and sensing information in a second time section after the first time section, determining that the ice stored in the ice maker is clumped in the second time section and that a cause of ice clumping is continuous supply of cold air in the second time section.

2. The management server of claim 1, wherein the controller is configured, based on (i) an operation of extracting the ice not being performed and fullness of the ice being sensed in the first time section and (ii) the operation of extracting the ice being performed and fullness of the ice being sensed in the second time section, to determine that the ice is clumped in the second time section.

3. The management server of claim 2, wherein the controller is configured, based on (i) the operation of extracting the ice being performed and fullness of the ice being sensed in the second time section and (ii) the operation of extracting the ice being performed at least once or more times and fullness of the ice being sensed in the second time section, to determine that the ice is clumped in the second time section.

4. The management server of claim 1, wherein the ice maker is configured, based on a user's input event, to generate operation information on extraction of the ice stored in the ice maker.

5. The management server of claim 4,
    wherein the ice maker is configured, based on an ice extraction button being pressed by the user for a predetermined time, to generate the operation information on extraction of the ice that corresponds to performance of the operation of extraction, and
    wherein the ice maker is configured, based on the ice extraction button being pressed by the user for less than the predetermined time, to generate the operation information on extraction of the ice that corresponds to no performance of the operation of extraction.

6. The management server of claim 1, wherein the ice maker comprises:
    an ice-fullness sensor configured to generate the sensing information; and
    an ice bin configured to receive the ice,
    wherein the ice-fullness sensor is configured to sense whether ice is present at an upper side of the ice bin.

7. The management server of claim 1, wherein the second time section is a current time section, and
    the first time section includes a predetermined number of days prior to the current time section.

8. The management server of claim 1, wherein a duration of the first time section is set based on a temperature of cold air supplied to the ice maker.

9. The management server of claim 1, wherein the communicator is configured to further receive turn-on information of the ice maker, and
    wherein the controller is configured, based on the ice maker being turned on during the first time section, to determine whether the ice is clumped.

10. The management server of claim 9,
    wherein the communicator is configured to further receive turn-on information of the refrigerator, and
    wherein the controller is configured, based on (i) the refrigerator being turned on during the second time section and (ii) the ice maker being turned on during the first time section, determine whether the ice is clumped.

11. The management server of claim 1, wherein the controller is configured, based on the ice being clumped, to generate a guide message informing a user that the ice is clumped, and
    wherein the communicator is configured to transmit the generated guide message to the ice maker or a user terminal device.

12. The management server of claim 1, wherein the controller is configured, based on the ice being clumped, to (i) generate a remote control instruction to declump the clumped ice, and (ii) transmit the generated remote control instruction to the ice maker.

13. The management server of claim 12, wherein the remote control instruction corresponds to an operation instruction of a blade provided in the ice maker.

14. A method for managing a refrigerator remotely by a management server comprising a communicator and a controller, the method comprising:
receiving, by the communicator, operation information on extraction of ice stored in an ice maker of the refrigerator, and sensing information on an amount of the ice stored in the ice maker;
based on (i) the received operation information and sensing information in a first time section and (ii) the received operation information and sensing information in a second time section after the first time section, determining, by the controller, that the ice stored in the ice maker is clumped in the second time section; and
communicating, by the communicator, with the refrigerator in a wired or wireless manner, that the ice stored in the ice maker is clumped and that a cause of ice clumping is continuous supply of cold air in the second time section.

15. The method of claim 14, the method comprising:
determining, by the controller, that the ice is clumped in the second time section based on (i) an operation of extracting the ice not being performed and fullness of the ice being sensed in the first time section and (ii) the operation of extracting the ice being performed and fullness of the ice being sensed in the second time section.

16. The method of claim 14, wherein the second time section is a current time section, and
the first time section includes a predetermined number of days prior to the current time section.

17. The method of claim 14, wherein a duration of the first time section is set based on a temperature of cold air supplied to the ice maker.

18. The method of claim 14, the method comprising:
receiving, by the communicator, turn-on information of the ice maker; and
determining, by the controller, whether the ice is clumped based on the ice maker being turned on during the first time section.

19. The method of claim 14, the method comprising:
generating, by the controller, a guide message informing a user that the ice is clumped based on the ice being clumped; and
transmitting, by the communicator, the generated guide message to the ice maker or a user terminal device.

20. The method of claim 14, the method comprising:
generating, by the controller, a remote control instruction to declump the clumped ice based on the ice being clumped; and
transmitting, by the communicator, the generated remote control instruction to the ice maker.

* * * * *